United States Patent
Cilia et al.

(10) Patent No.: US 9,838,693 B2
(45) Date of Patent: Dec. 5, 2017

(54) SYSTEM AND METHOD FOR HIGH-RESOLUTION STORAGE OF IMAGES

(75) Inventors: Andrew Cilia, McKinney, TX (US); Robert V. Vanman, McKinney, TX (US)

(73) Assignee: Enforcement Video, LLC, Allen, TX (US)

(*) Notice: Subject to any disclaimer, the term of this patent is extended or adjusted under 35 U.S.C. 154(b) by 1055 days.

(21) Appl. No.: 12/371,189

(22) Filed: Feb. 13, 2009

(65) Prior Publication Data

US 2009/0207248 A1   Aug. 20, 2009

(51) Int. Cl.
*H04N 19/136* (2014.01)
*H04N 19/17* (2014.01)

(52) U.S. Cl.
CPC .......... *H04N 19/136* (2014.11); *H04N 19/17* (2014.11); *G06K 2209/15* (2013.01)

(58) Field of Classification Search
USPC .................................................. 348/143, 149
See application file for complete search history.

(56) References Cited

U.S. PATENT DOCUMENTS

| | | |
|---|---|---|
| 3,752,047 A | 8/1973 | Gordon et al. |
| 4,258,421 A | 3/1981 | Juhasz et al. |
| 4,389,706 A | 6/1983 | Gomola et al. |
| 4,420,238 A | 12/1983 | Felix |
| 4,688,244 A | 8/1987 | Hannon et al. |
| 4,754,255 A | 6/1988 | Sanders et al. |
| 4,786,900 A | 11/1988 | Karasawa et al. |
| 4,789,904 A | 12/1988 | Peterson |
| 4,831,438 A | 5/1989 | Bellman, Jr. et al. |
| 4,843,463 A | 6/1989 | Michetti |
| 4,949,186 A | 8/1990 | Peterson |
| 4,992,943 A | 2/1991 | McCracken |
| 4,993,068 A | 2/1991 | Piosenka et al. |
| 5,027,104 A | 6/1991 | Reid |
| 5,111,289 A | 5/1992 | Lucas et al. |
| 5,136,655 A | 8/1992 | Bronson |
| 5,164,827 A | 11/1992 | Paff |
| 5,185,667 A | 2/1993 | Zimmermann |
| 5,225,882 A | 7/1993 | Hosokawa et al. |
| 5,430,431 A | 7/1995 | Nelson |
| 5,485,611 A | 1/1996 | Astle |

(Continued)

FOREIGN PATENT DOCUMENTS

| | | |
|---|---|---|
| EP | 707297 A1 | 4/1996 |
| FR | 2698596 B1 | 2/1995 |

(Continued)

OTHER PUBLICATIONS

U.S. Appl. No. 12/371,001, Cilia et al.

(Continued)

*Primary Examiner* — Sargon Nano
(74) *Attorney, Agent, or Firm* — Winstead PC

(57) ABSTRACT

An image-creation method includes capturing an image as digital data, locating an area of interest of the captured image, extracting, from the digital data, at least some data corresponding to the located area of interest, digitally magnifying the extracted at least some data to yield digitally magnified data, and combining the digitally magnified data with at least some of the digital data of the captured image to yield combined data.

24 Claims, 3 Drawing Sheets

(56) References Cited

U.S. PATENT DOCUMENTS

| | | |
|---|---|---|
| 5,491,464 A | 2/1996 | Carter et al. |
| 5,491,511 A | 2/1996 | Odle |
| 5,515,042 A | 5/1996 | Nelson |
| 5,539,454 A | 7/1996 | Williams |
| 5,570,127 A | 10/1996 | Schmidt |
| 5,579,239 A | 11/1996 | Freeman et al. |
| 5,651,075 A | 7/1997 | Frazier et al. |
| 5,677,979 A | 10/1997 | Squicciarini et al. |
| 5,682,133 A | 10/1997 | Johnson et al. |
| 5,689,442 A | 11/1997 | Swanson et al. |
| 5,703,604 A | 12/1997 | McCutchen |
| 5,708,780 A | 1/1998 | Levergood et al. |
| 5,734,337 A | 3/1998 | Kupersmit |
| 5,742,336 A | 4/1998 | Lee |
| 5,784,023 A | 7/1998 | Bluege |
| 5,787,367 A | 7/1998 | Berra |
| 5,799,083 A | 8/1998 | Brothers et al. |
| 5,809,161 A | 9/1998 | Auty et al. |
| 5,815,093 A | 9/1998 | Kikinis |
| 5,844,599 A | 12/1998 | Hildin |
| 5,852,664 A | 12/1998 | Iverson et al. |
| 5,857,159 A | 1/1999 | Dickrell et al. |
| 5,890,079 A | 3/1999 | Levine |
| 5,898,866 A | 4/1999 | Atkins et al. |
| 5,917,405 A | 6/1999 | Joao |
| 5,920,338 A | 7/1999 | Katz |
| 5,926,210 A | 7/1999 | Hackett et al. |
| 5,963,248 A | 10/1999 | Ohkawa et al. |
| 6,008,841 A | 12/1999 | Charlson |
| 6,028,528 A | 2/2000 | Lorenzetti et al. |
| 6,037,977 A | 3/2000 | Peterson |
| 6,076,026 A | 6/2000 | Jambhekar et al. |
| 6,092,008 A | 7/2000 | Bateman |
| 6,141,611 A | 10/2000 | Mackey et al. |
| 6,151,065 A | 11/2000 | Steed et al. |
| 6,211,907 B1 | 4/2001 | Scaman et al. |
| 6,215,519 B1 | 4/2001 | Nayar et al. |
| 6,252,989 B1 | 6/2001 | Geisler et al. |
| 6,259,475 B1 | 7/2001 | Ramachandran et al. |
| 6,282,462 B1 | 8/2001 | Hopkins |
| 6,326,714 B1 | 12/2001 | Bandera |
| 6,330,025 B1 | 12/2001 | Arazi et al. |
| 6,332,193 B1 | 12/2001 | Glass et al. |
| 6,335,789 B1 | 1/2002 | Kikuchi |
| 6,345,219 B1 | 2/2002 | Klemens |
| 6,373,962 B1 | 4/2002 | Kanade et al. |
| 6,389,340 B1 | 5/2002 | Rayner |
| 6,421,080 B1 | 7/2002 | Lambert |
| 6,430,488 B1 | 8/2002 | Goldman et al. |
| 6,445,824 B2 | 9/2002 | Hieda |
| 6,456,321 B1 | 9/2002 | Ito et al. |
| 6,490,513 B1 | 12/2002 | Fish et al. |
| 6,518,881 B2 | 2/2003 | Monroe |
| 6,542,076 B1 | 4/2003 | Joao |
| 6,545,601 B1 | 4/2003 | Monroe |
| 6,546,363 B1 | 4/2003 | Hagenbuch |
| 6,556,905 B1 | 4/2003 | Mittelsteadt et al. |
| 6,559,769 B2 | 5/2003 | Anthony et al. |
| 6,631,522 B1 | 10/2003 | Erdelyi |
| 6,636,256 B1 | 10/2003 | Passman et al. |
| 6,684,137 B2 | 1/2004 | Takagi et al. |
| 6,704,281 B1 | 3/2004 | Hourunranta et al. |
| 6,707,489 B1 | 3/2004 | Maeng et al. |
| 6,734,911 B1 | 5/2004 | Lyons |
| 6,801,574 B2 | 10/2004 | Takeuchi et al. |
| 6,812,835 B2 | 11/2004 | Ito et al. |
| 6,831,556 B1 | 12/2004 | Boykin |
| 6,950,013 B2 | 9/2005 | Scaman et al. |
| 6,950,122 B1 | 9/2005 | Mirabile |
| 6,959,122 B2 | 10/2005 | McIntyre |
| 6,965,400 B1 | 11/2005 | Haba et al. |
| 7,023,913 B1 | 4/2006 | Monroe |
| 7,119,832 B2 | 10/2006 | Blanco et al. |
| 7,131,136 B2 | 10/2006 | Monroe |
| 7,180,407 B1 | 2/2007 | Guo et al. |
| 7,190,882 B2 | 3/2007 | Gammenthaler |
| 7,215,876 B2 | 5/2007 | Okada et al. |
| 7,262,790 B2 | 8/2007 | Bakewell |
| 7,272,179 B2 | 9/2007 | Siemens et al. |
| 7,363,742 B2 | 4/2008 | Nerheim |
| 7,373,395 B2 | 5/2008 | Brailean et al. |
| 7,382,244 B1 | 6/2008 | Donovan et al. |
| 7,405,834 B1 | 7/2008 | Marron et al. |
| 7,471,334 B1 | 12/2008 | Stenger |
| 7,570,158 B2 | 8/2009 | Denny et al. |
| 7,570,476 B2 | 8/2009 | Nerheim |
| 7,574,131 B2 | 8/2009 | Chang et al. |
| 7,583,290 B2 | 9/2009 | Enright et al. |
| 7,646,312 B2 | 1/2010 | Rosen |
| 7,702,015 B2 | 4/2010 | Richter et al. |
| 7,711,150 B2 | 5/2010 | Simon |
| 7,768,548 B2 | 8/2010 | Silvernail et al. |
| 7,787,025 B2 | 8/2010 | Sanno et al. |
| 7,804,426 B2 | 9/2010 | Etcheson |
| 7,880,766 B2 | 2/2011 | Aoki et al. |
| 7,920,187 B2 | 4/2011 | Sanno et al. |
| 7,929,010 B2 * | 4/2011 | Narasimhan ............... 348/14.01 |
| 7,944,676 B2 | 5/2011 | Smith et al. |
| 7,973,853 B2 | 7/2011 | Ojima et al. |
| 7,995,652 B2 | 8/2011 | Washington |
| 8,022,874 B2 | 9/2011 | Frieaizen |
| 8,037,348 B2 | 10/2011 | Wei et al. |
| 8,050,206 B2 | 11/2011 | Siann et al. |
| 8,446,469 B2 | 5/2013 | Blanco et al. |
| 8,594,485 B2 | 11/2013 | Brundula |
| 8,805,431 B2 | 8/2014 | Vasavada et al. |
| 8,819,686 B2 | 8/2014 | Memik et al. |
| 8,837,901 B2 | 9/2014 | Shekarri et al. |
| 9,058,499 B1 | 6/2015 | Smith |
| 9,325,950 B2 | 4/2016 | Haler |
| 9,331,997 B2 | 5/2016 | Smith |
| 9,377,161 B2 | 6/2016 | Hanchett et al. |
| 9,432,298 B1 | 8/2016 | Smith |
| 2001/0052137 A1 | 12/2001 | Klein |
| 2002/0040475 A1 | 4/2002 | Yap et al. |
| 2002/0064314 A1 | 5/2002 | Comaniciu et al. |
| 2002/0135679 A1 | 9/2002 | Scaman |
| 2002/0140924 A1 | 10/2002 | Wangler et al. |
| 2002/0141618 A1 * | 10/2002 | Ciolli et al. .................. 382/104 |
| 2002/0141650 A1 | 10/2002 | Keeney et al. |
| 2002/0149476 A1 | 10/2002 | Ogura |
| 2002/0180759 A1 | 12/2002 | Park et al. |
| 2002/0183905 A1 | 12/2002 | Maeda et al. |
| 2002/0186148 A1 | 12/2002 | Trajkovic et al. |
| 2003/0025599 A1 | 2/2003 | Monroe |
| 2003/0025812 A1 | 2/2003 | Slatter |
| 2003/0052798 A1 | 3/2003 | Hanson |
| 2003/0071891 A1 | 4/2003 | Geng |
| 2003/0086000 A1 | 5/2003 | Siemens et al. |
| 2003/0095338 A1 | 5/2003 | Singh et al. |
| 2003/0112133 A1 | 6/2003 | Webb et al. |
| 2003/0142209 A1 | 7/2003 | Yamazaki et al. |
| 2003/0151663 A1 | 8/2003 | Lorenzetti et al. |
| 2003/0154009 A1 | 8/2003 | Basir et al. |
| 2003/0172123 A1 | 9/2003 | Polan et al. |
| 2003/0185419 A1 | 10/2003 | Sumitomo |
| 2003/0210329 A1 | 11/2003 | Aagaard et al. |
| 2003/0210806 A1 | 11/2003 | Shintani et al. |
| 2003/0212567 A1 | 11/2003 | Shintani et al. |
| 2003/0214585 A1 | 11/2003 | Bakewell |
| 2004/0008255 A1 | 1/2004 | Lewellen |
| 2004/0017930 A1 | 1/2004 | Kim et al. |
| 2004/0021852 A1 | 2/2004 | DeFlumere |
| 2004/0056779 A1 | 3/2004 | Rast |
| 2004/0080615 A1 | 4/2004 | Klein et al. |
| 2004/0096084 A1 | 5/2004 | Tamoto et al. |
| 2004/0119869 A1 | 6/2004 | Tretter et al. |
| 2004/0150717 A1 | 8/2004 | Page et al. |
| 2004/0189804 A1 | 9/2004 | Borden et al. |
| 2004/0201765 A1 | 10/2004 | Gammenthaler |
| 2004/0218099 A1 * | 11/2004 | Washington ............... 348/571 |
| 2004/0221311 A1 | 11/2004 | Dow et al. |
| 2004/0223058 A1 | 11/2004 | Richter et al. |
| 2004/0252193 A1 * | 12/2004 | Higgins ....................... 348/149 |

(56) References Cited

U.S. PATENT DOCUMENTS

| | | |
|---|---|---|
| 2004/0258149 A1 | 12/2004 | Robinson et al. |
| 2005/0083404 A1 | 4/2005 | Pierce et al. |
| 2005/0090961 A1 | 4/2005 | Bonk et al. |
| 2005/0099273 A1 | 5/2005 | Shimomura et al. |
| 2005/0101334 A1 | 5/2005 | Brown et al. |
| 2005/0128064 A1 | 6/2005 | Riesebosch |
| 2005/0151671 A1 | 7/2005 | Bortolotto |
| 2005/0151852 A1 | 7/2005 | Jomppanen |
| 2005/0196140 A1 | 9/2005 | Moteki |
| 2005/0206773 A1 | 9/2005 | Kim et al. |
| 2005/0212912 A1 | 9/2005 | Huster |
| 2005/0243171 A1 | 11/2005 | Ross et al. |
| 2005/0258942 A1 | 11/2005 | Manasseh et al. |
| 2006/0010199 A1 | 1/2006 | Brailean et al. |
| 2006/0012683 A9 | 1/2006 | Lao et al. |
| 2006/0028547 A1 | 2/2006 | Chang |
| 2006/0033813 A1 | 2/2006 | Provinsal et al. |
| 2006/0098843 A1 | 5/2006 | Chew |
| 2006/0133476 A1 | 6/2006 | Page et al. |
| 2006/0152636 A1 | 7/2006 | Matsukawa et al. |
| 2006/0158968 A1 | 7/2006 | Vanman et al. |
| 2006/0159325 A1 | 7/2006 | Zeineh et al. |
| 2006/0187305 A1 | 8/2006 | Trivedi et al. |
| 2006/0193384 A1 | 8/2006 | Boyce |
| 2006/0209189 A1 | 9/2006 | Simpson |
| 2006/0244826 A1 | 11/2006 | Chew |
| 2006/0269265 A1 | 11/2006 | Wright et al. |
| 2006/0274166 A1 | 12/2006 | Lee et al. |
| 2007/0013776 A1 | 1/2007 | Venetianer et al. |
| 2007/0024706 A1 | 2/2007 | Brannon et al. |
| 2007/0029825 A1 | 2/2007 | Franklin et al. |
| 2007/0035612 A1 | 2/2007 | Korneluk et al. |
| 2007/0097212 A1 | 5/2007 | Farneman |
| 2007/0109411 A1 | 5/2007 | Jung et al. |
| 2007/0188612 A1 | 8/2007 | Carter |
| 2007/0200933 A1* | 8/2007 | Watanabe et al. ........ 348/211.11 |
| 2007/0217761 A1* | 9/2007 | Chen et al. ................. 386/86 |
| 2007/0219686 A1 | 9/2007 | Plante |
| 2007/0222678 A1 | 9/2007 | Ishio et al. |
| 2007/0222859 A1 | 9/2007 | Chang et al. |
| 2007/0230943 A1 | 10/2007 | Chang et al. |
| 2007/0260363 A1 | 11/2007 | Miller |
| 2007/0268370 A1 | 11/2007 | Sanno et al. |
| 2007/0274705 A1 | 11/2007 | Kashiwa et al. |
| 2007/0291104 A1 | 12/2007 | Petersen et al. |
| 2007/0296817 A1 | 12/2007 | Ebrahimi et al. |
| 2008/0002028 A1 | 1/2008 | Miyata |
| 2008/0007438 A1 | 1/2008 | Segall et al. |
| 2008/0036580 A1 | 2/2008 | Breed |
| 2008/0100705 A1 | 5/2008 | Kister et al. |
| 2008/0129844 A1 | 6/2008 | Cusack et al. |
| 2008/0218596 A1 | 9/2008 | Hoshino |
| 2008/0301088 A1 | 12/2008 | Landry et al. |
| 2009/0002491 A1 | 1/2009 | Haler |
| 2009/0046157 A1 | 2/2009 | Cilia et al. |
| 2009/0049491 A1 | 2/2009 | Karonen et al. |
| 2009/0088267 A1 | 4/2009 | Shimazaki et al. |
| 2009/0102950 A1 | 4/2009 | Ahiska |
| 2009/0129672 A1 | 5/2009 | Camp, Jr. et al. |
| 2009/0195655 A1 | 8/2009 | Pandey |
| 2009/0207252 A1 | 8/2009 | Raghunath |
| 2009/0213218 A1 | 8/2009 | Cilia et al. |
| 2009/0237529 A1 | 9/2009 | Nakagomi et al. |
| 2009/0251530 A1 | 10/2009 | Cilia |
| 2009/0300692 A1 | 12/2009 | Mavlankar et al. |
| 2009/0320081 A1 | 12/2009 | Chui et al. |
| 2010/0026802 A1 | 2/2010 | Titus et al. |
| 2010/0165109 A1 | 7/2010 | Lang |
| 2010/0208068 A1 | 8/2010 | Elsemore |
| 2010/0225817 A1 | 9/2010 | Sheraizin et al. |
| 2010/0238327 A1 | 9/2010 | Griffith et al. |
| 2010/0245568 A1 | 9/2010 | Wike, Jr. et al. |
| 2010/0321183 A1 | 12/2010 | Donovan et al. |
| 2011/0053654 A1 | 3/2011 | Petrescu et al. |
| 2011/0074580 A1 | 3/2011 | Mercier et al. |
| 2011/0110556 A1 | 5/2011 | Kawakami |
| 2011/0134141 A1 | 6/2011 | Swanson et al. |
| 2011/0157376 A1 | 6/2011 | Lyu et al. |
| 2011/0234749 A1 | 9/2011 | Alon |
| 2011/0242277 A1 | 10/2011 | Do et al. |
| 2011/0249153 A1 | 10/2011 | Hirooka et al. |
| 2011/0267499 A1 | 11/2011 | Wan et al. |
| 2011/0285845 A1 | 11/2011 | Bedros et al. |
| 2011/0292287 A1 | 12/2011 | Washington |
| 2011/0310435 A1 | 12/2011 | Tsuji et al. |
| 2012/0040650 A1 | 2/2012 | Rosen |
| 2012/0092522 A1 | 4/2012 | Zhang et al. |
| 2013/0150004 A1 | 6/2013 | Rosen |
| 2013/0287090 A1 | 10/2013 | Sasaki et al. |
| 2014/0059166 A1 | 2/2014 | Mann et al. |
| 2014/0139680 A1 | 5/2014 | Huang et al. |
| 2014/0192192 A1 | 7/2014 | Worrill et al. |
| 2014/0240500 A1 | 8/2014 | Davies |
| 2014/0355951 A1 | 12/2014 | Tabak |
| 2015/0050923 A1 | 2/2015 | Tu et al. |
| 2015/0054639 A1 | 2/2015 | Rosen |
| 2016/0073025 A1 | 3/2016 | Cilia |

FOREIGN PATENT DOCUMENTS

| | | |
|---|---|---|
| GB | 2287152 A | 9/1995 |
| GB | 2317418 A | 3/1998 |
| JP | 2006311039 | 11/2006 |
| KR | 1050897 | 7/2011 |
| WO | WO-9320655 A1 | 10/1993 |
| WO | WO-9419212 A2 | 9/1994 |
| WO | WO-9528783 A1 | 10/1995 |
| WO | WO-9622202 A1 | 7/1996 |
| WO | WO-9738526 A1 | 10/1997 |
| WO | WO-9852358 A1 | 11/1998 |
| WO | WO-9918410 A1 | 4/1999 |
| WO | WO-0197524 A1 | 12/2001 |
| WO | WO-2004/036926 A2 | 4/2004 |
| WO | WO-2007104367 A1 | 9/2007 |
| WO | WO-2013100933 A1 | 7/2013 |

OTHER PUBLICATIONS

Young, Lee W., International Search Report for PCT/US2009/000934 dated Apr. 29, 2009, (3 pages).

U.S. Appl. No. 12/694,931, Cilia.

U.S. Appl. No. 12/779,492, Vanman.

U.S. Appl. No. 12/779,564, Vanman.

U.S. Appl. No. 12/780,050, Vanman.

U.S. Appl. No. 12/780,092, Vanman.

Copenheaver, Blaine R., International Search Report for PCT/US2010030861 dated Jun. 21, 2010, (4 pages).

Nhon, Diep T., International Search Report for PCT/US05/36701 dated Oct. 25, 2006 (5 pages).

Copenheaver, Blaine R., International Search Report for PCT/US2009/032462 dated Mar. 10, 2009 (3 pages).

U.S. Appl. No. 12/362,302, Andrew Cilia et al.

U.S. Appl. No. 13/095,107, Cilia.

U.S. Appl. No. 13/109,557, Cilia.

Copenheaver, Blaine R., International Search Report for PCT/US2009/000930 dated Apr. 9, 2009, (4 pages).

Kortum, P. et al., "Implementation of a foveated image coding system for image bandwidth reduction", SPIE Proceedings, vol. 2657, 1996, pp. 350-360, XP-002636638.

Geisler, Wilson S. et al., "A real-time foveated multiresolution system for low-bandwidth video communication", Proceedings of the SPIE—The International Society for Optical Engineering SPIE—Int. Soc. Opt. Eng. USA, vol. 3299,1998, pp. 294-305, XP-002636639.

Cilia, Andrew, "U.S. Appl. No. 13/489,615" filed Jun. 6, 2012.

ICOP Extreme Wireless Mic, Operation Supplement; 2008.

Raytheon JPS Communications, Ratheon Model 20/20-W, Raytheon 20/20 Vision Digital In-Car Video Systems; Feb. 2010.

Product Review: ICOP Model 20/20-W; May 19, 2009.

(56) References Cited

OTHER PUBLICATIONS

State of Utah Invitation to Bid State Cooperative Contract, Contract No. MA503; Jul. 3, 2008.
X26 Taser; date unknown.
Taser X26 Specification Sheet; 2003.
Affidavit of Christopher Butler of Internet Archive attesting to the public availability of the 20/20-W Publication on Nov. 25, 2010.
International Association of Chiefs of Police Digital Video System Minimum Specifications Nov. 21, 2008.
City of Pomona Request for Proposal for Mobile Video Recording System for Police Vehicles; Apr. 4, 2013.
"TASER Int'l (TASR) Challenges to Digital Ally's (DGLY) Patents", StreetInsider.com, http://www.streetinsider.com/Corporate+News/TASER+Intl+(TASER)+Challenges+to+Digital+Allys+(DGLY)+Patents/12302550 html Dec. 1, 2016.
Rowe, Lawrence A., et al.; "Indexes for User Access to Large Video Databases"; Storage and Retrieval for Image and Video Databases II, IS&T/SPIE Symp. on Elec. Imaging Sci. & Tech.; San Jose, CA; Feb. 1994; 12 pages.
Polybius; "The Histories," vol. III: Books 5-8; Harvard University Press; 1923; pp. 385 & 387.
Crisman, P.A. (editor); "The Compatible Time-Sharing System: A Programmer's Guide," second edition; The M.I.T. Press, Cambridge Massachusetts; 1965; 587 pages.
Kotadia, Munir; "Gates Predicts Death of the Password"; http://www.cnet.com/news/gates-predicts-death-of-the-password/?ftag=CADe856116&bhid=; Feb. 25, 2004; 3 pages.
Morris, Robert, et al.; "Password Security: A Case History"; Communications of the ACM, vol. 22, No. 11; Nov. 1979; pp. 594-597.
Cranor, Lorrie Faith, et al.; "Security and Usability: Designing Secure Systems that People Can Use"; O'Reilly Media; Aug. 2005; pp. 3 & 104.
Chirillo, John; "Hack Attacks Encyclopedia: A Complete History of Hacks, Cracks, Phreaks, and Spies Over Time"; John Wiley & Sons, Inc.; 2001; 485-486.
Stonebraker, Michael, et al.; "Object-Relational DBMSs: Tracking the Next Great Wave"; Second Ed.; Morgan Kaufmann Publishers, Inc.; 1999; pp. 3, 173, 232-237, 260.
Stonebraker, Michael, et al.; "Object-Relational DBMSs: The Next Great Wave"; Morgan Kaufmann Publishers, Inc.; 1996; pp. 105, 107, 166-168.
Barwick, Sandra; "Two Wheels Good, Four Wheels Bad"; The Independent; http://www.independent.co.uk/voices/two-wheels-good-four-wheels-bad-1392034.html; Feb. 4, 1994; 11 pages.
Mcfee, John E., et al.; "Multisensor Vehicle-Mounted Teleoperated Mine Detector with Data Fusion"; SPIE Proceedings, vol. 3392; Apr. 13, 1998; 2 pages.
Malcolm, Andrew H.; "Drunken Drivers Now Facing Themselves on Video Camera"; The New York Times; http://www.nytimes.com/1990/04/21/us/drunken-drivers-now-facing-themselves-on-video-camera.html; Apr. 21, 1990; 3 pages.
Kaplan, A.E., et al.; "An Internet Accessible Telepresence"; Multimedia Systems, vol. 5, Issue 2; Mar. 1997; Abstract only; 2 pages.
Sabatini, Richard V.; "State Police Cars in Pa. Get Cameras Patrol Stops Will be Videotaped. The Units will Benefit Citizens and Police, Authorities Say"; http://articles.philly.com/1996-03-30/news/25637501_1_patrol-car-state-police-commissioner-paull-evanko; Mar. 30, 1996; 2 pages.
Stockton, Gregory R., et al.; "Why Record? (Infrared Video)"; Infraspection Institute's IR/INFO '98 Symposium, Orlando, Florida; Jan. 25-28, 1998; 5 pages.
Racepak LLC; "Racepak DataLink Software" http://www.racepak.com/software.php.; Feb. 3, 2008; 4 pages.
Pavlopoulos, S., et al.; "A Novel Emergency Telemedicine System Based on Wireless Communication Technology—Ambulance"; IEEE Trans Inf Technol Biomed, vol. 2, No. 4; Dec. 1998; Abstract only; 2 pages.
Horne, Mike; "Future Video Accident Recorder"; http://www.iasa.com.au/folders/Publications/pdf_library/horne.pdf; May 1999; 9 pages.
Townsend & Taphouse; "Microsentinel I"; http://www.blacksheepnetworks.com/security/resources/encyclopedia/products/prod19.htm; Jul. 5, 2003; 1 page.
Security Data Networks, Inc.; "Best of Show Winner at CES Consumer Electronics Show is MicroSentinel(R) Wireless Internet Based Security System that Allows Users to Monitor their Home, Family, or Business using any Internet or E-Mail Connection"; PR Newswire; http://www.prnewswire.com/news-releases/best-of-show-winner-at-ces-consumer-electronics-show-is-microsentinelr-wireless-internet-based-security-system-that-allows-users-to-monitor-their-home-family-or-business-using-any-internet-or-e-mail-connection-73345197.html; Jan. 7, 1999; 3 pages.
Draper, Electra; "Mission Possible for Loronix"; Denver Post; http://extras.denverpost.com/business/top100b.htm; Aug. 13, 2000; 2 pages.
"Choosing the Right Password"; The Information Systems Security Monitor (ISSM); vol. 2, No. 2; Apr. 1992; 2 pages.
Aref, Walid G., et al.; "A Video Database Management System for Advancing Video Database Research"; In Proc. of the Int Workshop on Management Information Systems; Nov. 2002; 10 pages.
U.S. Appl. No. 15/481,214, Vanman et al.
Carlier, Axel, et al.; "Combining Content-Based Analysis and Crowdsourcing to Improve User Interaction with Zoomable Video"; Proceedings of the 19th International Conference on Multimedia 2011; Nov. 28-Dec. 1, 2011; pp. 43-52.
Mavlankar, Aditya, et al.; "Region-of-Interest Prediction for Interactively Streaming Regions of High Resolution Video"; Proceedings of the 16th IEEE International Packet Video Workshop; Nov. 2007; 10 pages.
Sony Corporation; "Network Camera: User's Guide: Software Version 1.0: SNC-RZ25N/RZ25P"; 2004; 81 pages.

* cited by examiner

SYSTEM AND METHOD FOR HIGH-RESOLUTION STORAGE OF IMAGES

CROSS-REFERENCE TO RELATED APPLICATIONS

This patent application claims priority from, and incorporates by reference for any purpose the entire disclosure of, U.S. Provisional Patent Application No. 61/029,101, filed Feb. 15, 2008. In addition, this patent application claims priority from and incorporates by reference U.S. Provisional Patent Application No. 61/029,092, also filed Feb. 15, 2008. This patent application also incorporates by reference U.S. Patent Application Publication No. 2006/0158968, filed on Oct. 12, 2005, and a patent application filed on the same date as this patent application and bearing Ser. No. 12/371,001.

TECHNICAL FIELD

This application relates generally to video surveillance and more particularly to systems and methods for high-resolution storage of images.

BACKGROUND

Many police cars now include a video camera to capture activities transpiring both outside and inside the vehicle. One use of the video captured by these cameras is as evidence in a criminal trial. In order for the videos to be used as evidence, the images must be clearly identifiable by, for example, a jury or an expert witness. Often police cars and their corresponding devices for recording video data may remain in use for extended periods of time, for example, when an officer stays out on patrol overnight. It is often necessary to compress the video being recorded in order to be able to store those large volumes of data.

In order to store the large amount of data captured by the video camera over long periods of time, compression algorithms are normally used to compress the data. There are various compression algorithms currently in use for compressing videos, such as lossless and lossy algorithms. In a lossy algorithm, some visual quality is lost in the compression process and cannot be restored. The various compression algorithms utilize a combination of techniques for compressing the data such as downsampling or subsampling, block splitting, pixilating, and lowering resolution. A few examples of compression algorithms include the MPEG family of algorithms such as MPEG 2 and MPEG 4.

SUMMARY OF THE INVENTION

An image-creation method includes capturing an image as digital data, locating an area of interest of the captured image, extracting, from the digital data, at least some data corresponding to the located area of interest, digitally magnifying the extracted at least some data to yield digitally magnified data, and combining the digitally magnified data with at least some of the digital data of the captured image to yield combined data.

An article of manufacture for image creation includes at least one computer readable medium, and processor instructions contained on the at least one computer readable medium. The processor instructions are configured to be readable from the at least one computer readable medium by at least one processor and thereby cause the at least one processor to operate to capture an image as digital data, locate an area of interest of the captured image, extract, from the digital data, at least some data corresponding to the located area of interest, digitally magnify the extracted at least some data to yield digitally magnified data, and combine the digitally magnified data with at least some of the digital data of the captured image to yield combined data.

BRIEF DESCRIPTION OF THE DRAWINGS

A more complete understanding of various embodiments of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Various embodiments of the present invention contemplate identifying areas of importance in a video image that would be desirable to save in a high-resolution format. Some embodiments contemplate magnifying areas of interest before compressing video of the areas of interest so that deleterious effects of compression losses of some video data may be lessened. In that way, large volumes of data can be stored while minimizing the loss of clarity of the areas of interest. The above summary of the invention is not intended to represent each embodiment or every aspect of the present invention.

In some cameras, a data stream coming from the camera may contain both chroma (i.e., color information) and luma (i.e., brightness or black-and-white information). Most of the resolution may be contained in the black-and-white content of the video, even though the images may be color images. In some video streams, the resolution of the black and white pixels may be, for example, four times that of the color. Between the luma and chroma information, the luma may contain much of the information relative to how much detail is visible in a given image.

Clarity is often critical to police work, for example, to identify a particular vehicle or suspect to a jury. Therefore, it is important that recorded images remain clear even after video of the images has been compressed. For example, when video of a traffic stop is recorded, it is important that clarity of a license-plate portion of the video remains so that letters and numbers of the license plate are identifiable. However, almost all compression algorithms lower the clarity and sharpness of images being compressed, making things like facial features, letters, and numbers harder to identify. For example, some cameras may capture data at the equivalent of approximately 480 horizontal lines while the data may be stored at only, for example, 86 horizontal lines. The resolution of the recorded video may therefore be, for example, one-fourth the resolution of the video the camera actually captured. By accessing video data while it is still at its captured resolution, effects of the compression algorithms and lower resolution settings on the readability of the license plates or other images can be minimized.

Figures 1, 2:
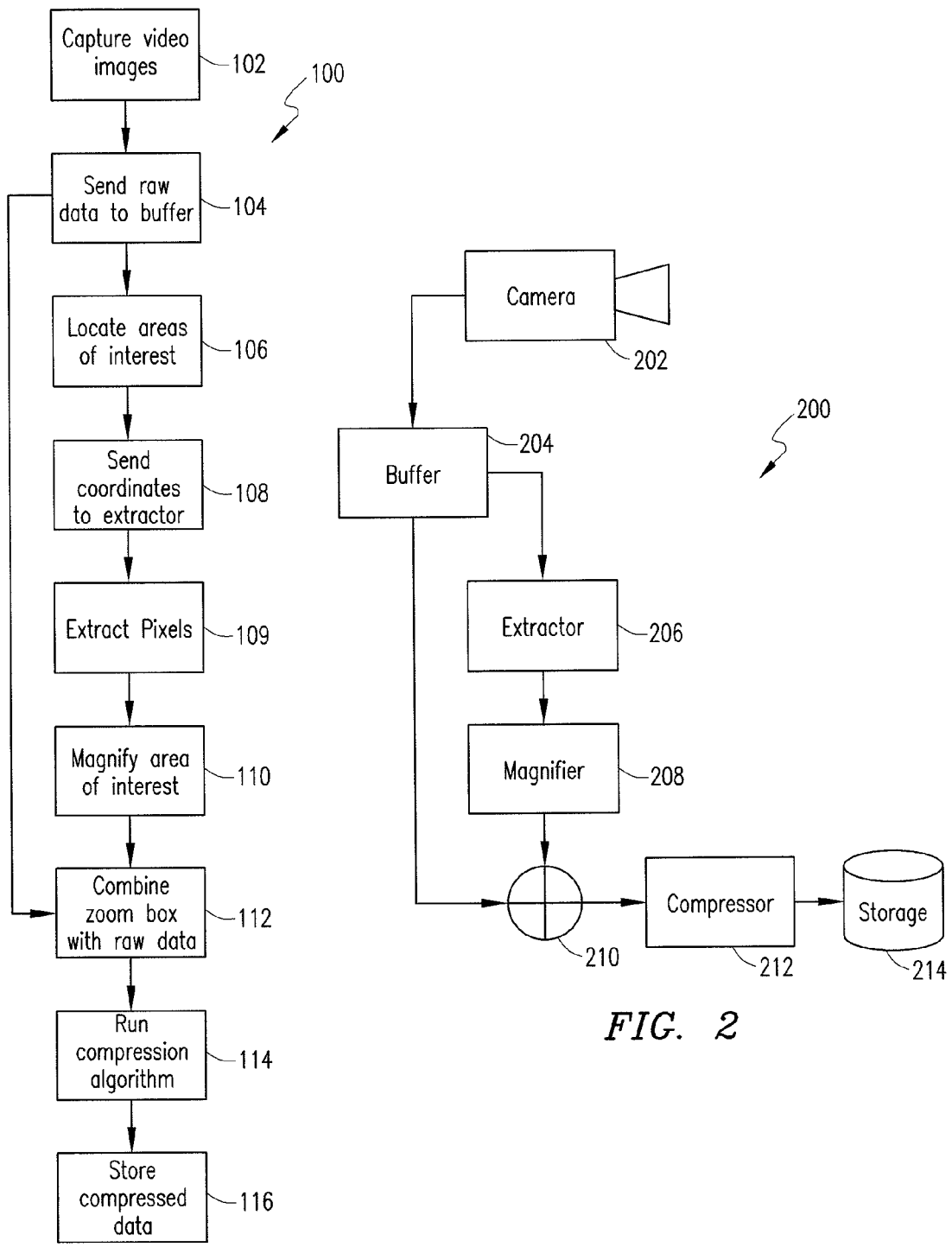
FIG. 1 is a flow chart of a process for compressing and storing data.
FIG. 2 is a diagram of a system for capturing and storing video data.

FIG. 1 is a flow chart showing a process 100 for automatic image magnification. The process 100 begins at step 102. At step 102, an image capture device, such as a camera, captures video images in a field of view of the camera. In some embodiments, the camera may be mounted in a police car and adapted to capture video while the police car is moving and also when the police car is stopped, for example, during a traffic stop.

From step 102, execution proceeds to step 104. At step 104, the captured video images are sent to a buffer. At step 106, areas of interest in the captured and buffered data are located. In some embodiments, raw data of the captured images may be read and an automatic license-plate locator algorithm run to identify, for example, whether one or more license plates are in the field of view. In some embodiments, only the luma information and not the chroma information may be viewed. The luma information may have more resolution than the chroma information. In some embodiments, a CPU may, for example, run a facial-feature location algorithm typically used, for example, to identify whether there are people in the field of view. In various embodiments, the license-plate location algorithm runs on raw data coming from the camera. It is also contemplated that the license-plate location algorithm may run on compressed data and a feedback signal may be sent as to the location of the pixels to be extracted from the uncompressed data.

Once the one or more areas of interest (e.g., license plates or faces) have been located at step 108, the location information relative to each of the areas of interest is sent to an extractor. For example, the location information sent may be one or more sets of coordinates, such as, for example, coordinates corresponding to the four corners of a license plate. Information related to, for example, the size of the one or more license plates may also be sent. At step 109, the location information is used to extract data corresponding to the area of interest, (e.g., the areas of license plates). At step 110, the extracted data may be altered so that pixels represented thereby are magnified relative to an original image to yield a magnified image. At step 112, the data representing the magnified image is combined with at least some of the data captured by the video camera at step 102. The combined data, including the raw data and the magnified-image data, is compressed at step 114 to yield combined compressed data. At step 116, the combined compressed data is stored on a recordable medium such as, for example, a digital video disc (DVD).

Referring now to FIG. 2, a system 200 for magnifying areas of interest is shown. A camera 202 captures raw video data. The raw video data is sent by the camera 202 to a buffer 204. The camera 202 may be pointing through, for example, the windshield of a police car. Data corresponding to a zoom area (e.g., a zoom box) subset of the raw video data from the camera is extracted from the buffer 204 by an extractor 206. The extracted data is digitally magnified by a magnifier 208, to yield a magnified zoom area. The digitally magnified zoom area is inserted into the raw data by a combiner 210 to yield a combined data output. The combined data is output by the combiner 210, compressed by a compressor 212, and stored onto a storage medium 214. Each of the buffer 204, the extractor 206, the magnifier 208, the combiner 210, the compressor 212, and the storage 214 may be hardware or software based.

Those having skill in the art will recognize that the embodiment shown in FIG. 2 does not necessarily require an automatic license-plate locator algorithm because, for example, the zoom area may be a fixed area on the field of view of the camera. To ensure the zoom area encompasses a license plate or other area of interest, in some embodiments an officer can point the camera in a particular direction so that the fixed zoom area captures the area of interest. For example, the office may pull up behind a car and steer the police car so the zoom area captures the license plate of the car. Additionally, the officer may, for example, rotate the camera so that the zoom area encompasses the area of interest. In some embodiments, the zoom area may be moved within the field of view by a user interface, such as a touch screen or directional buttons, to change the area being magnified without needing to aim the camera's lens.

Figure 3:
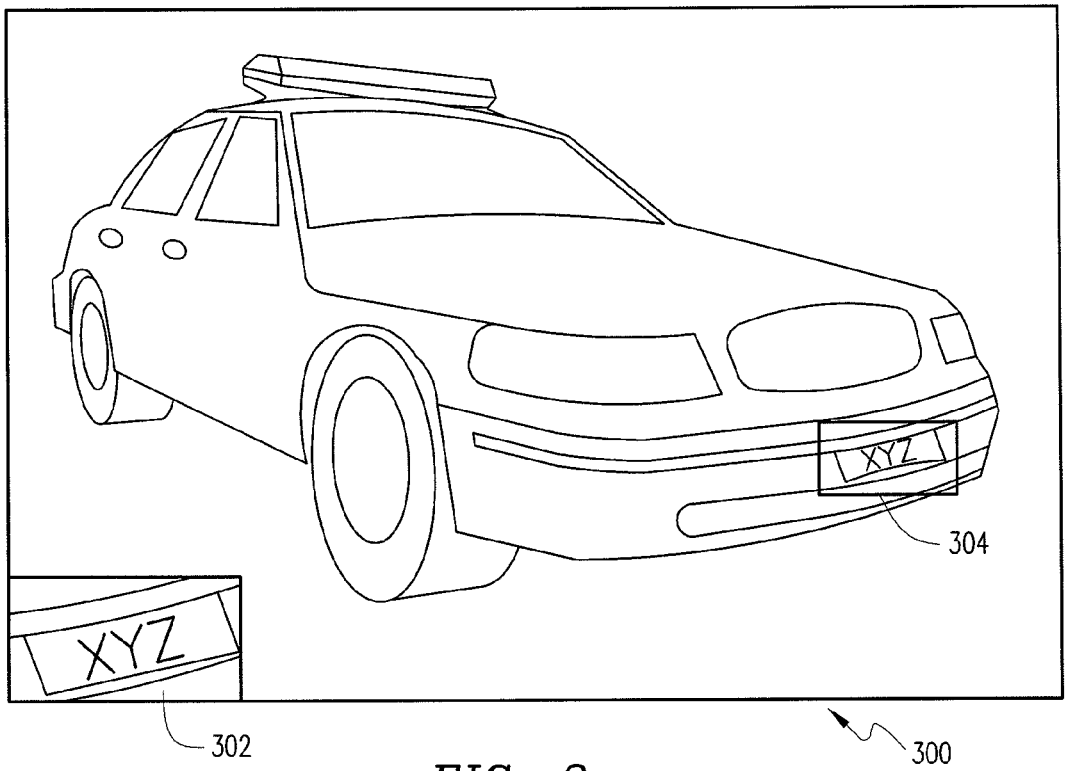
FIG. 3 is an illustrative view of a video image with an insert in a corner of the image.

Referring now to FIG. 3, an image 300 is shown. The image 300 has a magnified insert 302. An area of interest has been highlighted by a zoom box 304 in the image 300. In some embodiments, an automatic license-plate locator algorithm may have been run to locate the license plate in the image 300. In some embodiments, a user may have moved the zoom box 304 to position the zoom box 304 over an area of interest. In the embodiment shown, the magnified area 302 has been inserted on top of a different area of the image 300, for example in a bottom corner as a picture-in-picture (PIP) view.

In some embodiments, an indication of where the zoom box 304 was originally located before extraction is included in the stored data. For example, a thin colored line may encompass the license plate of the car whose license plate has been magnified. In some embodiments, multiple license plates in one field of view may be identified and rotated among by sequentially zooming the various license plates. As each license plate is in turn magnified, an indicator, for example, a thin red line, may, for example, encompass or highlight the license plate being magnified. In some embodiments, a plurality of different indicators, for example, different colored thin lines, may be used so that a plurality of license plates can be magnified at the same time with each different colored indicator showing the location of the magnified license plate relative to the original image.

Figure 4:
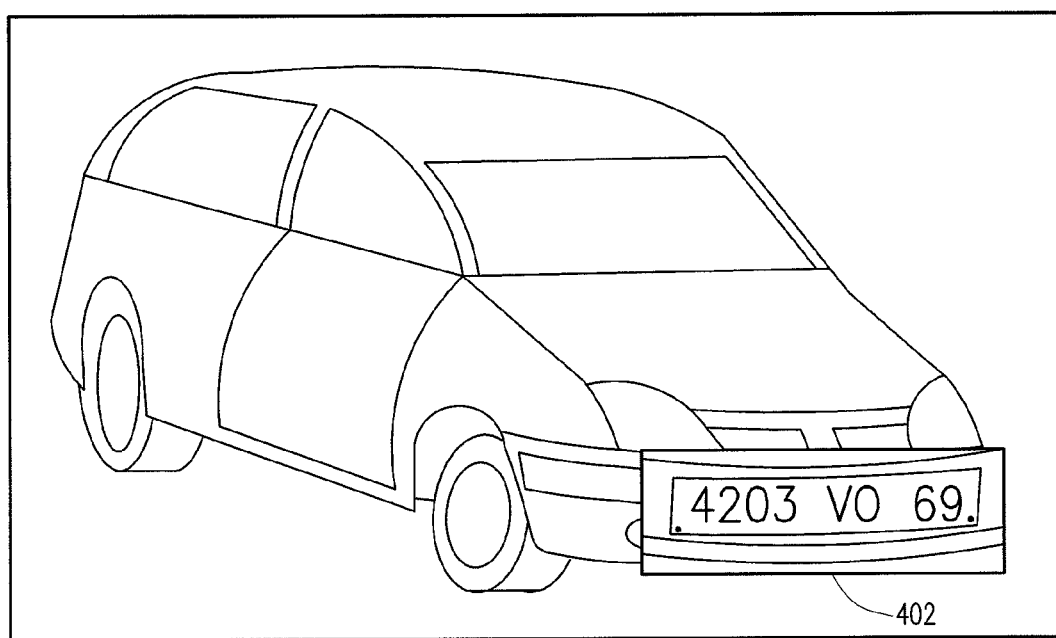
FIG. 4 is an illustrative view of a video image with a magnified area inserted into the image.

Referring now to FIG. 4, another way of inserting an image into a field of view is shown. In an image 400, a zoom box 402 containing a magnified image has been inserted back into the image 400 in approximately the same position from which the original image was removed. In the embodiment shown, the magnified image overlaps onto a larger area than that which was originally removed. In some embodiments, the zoom box 402 may be limited to the original size of the part of the image 400 that was removed. For example, the magnified image 402 may be placed back over the part of the image 400 in which the original license plate was located. In various embodiments, the face of a driver or other information may be within the area of interest that is magnified, for example, by increasing the size of the image and inserting it back into the field of view on top of the original image.

Figure 5:
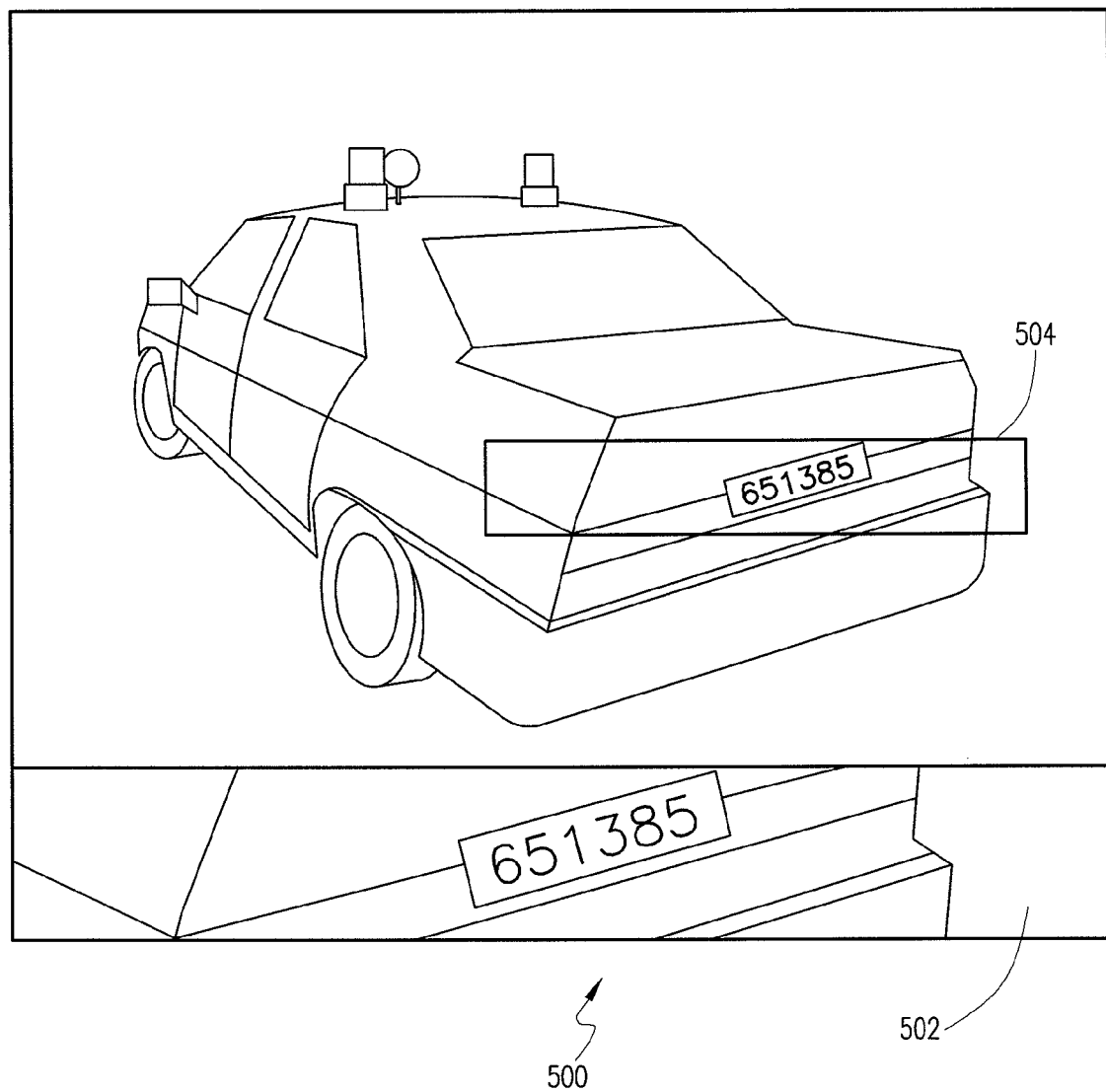
FIG. 5 is an illustrative view of a video image with a fixed zoom box.

Referring now to FIG. 5, a fixed region, for example a strip across the middle of a video image captured by a camera may be magnified and inserted along the bottom of a video to be stored. Oftentimes, the hood of the police car is in the field of view of the camera. Since video of the hood does not typically need to be recorded, it may be desirable to insert the magnified video image along the bottom of the field of view. Similarly, oftentimes the sky is recorded; in that case, it may be desirable to insert the strip of magnified video across the top of the field of view where the sky is usually located. In other embodiments, a vertical strip may be magnified and inserted. In various embodiments, a user has the option of selecting the size and shape of the area being recorded and where the magnified images should be inserted. Those having skill in the art will appreciate that various embodiments may permit magnified still images to be recorded or magnified video to be recorded or both.

In some embodiments, the video output saved to the storage device may be at the same video quality and same compression level and take up approximately the same amount of storage space, but, due to magnification, the areas of interest are more readable. While the area of interest is typically readable without need for an optical zoom of the camera, in some embodiments, an optical zoom may be used to further enhance resolution of areas of interest. Similarly, some embodiments contemplate use of a digital zoom. In some embodiments, the process is different from a typical digital zoom because video may be accessed while the video is still in a raw form. In that way, a high-resolution image may be extracted before the compression algorithm has been implemented and before reduced video quality settings have been applied.

Although various embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. An image-creation method comprising:
    capturing an image as digital data;
    locating an area of interest of the captured image;
    extracting, from the digital data, at least some data corresponding to the located area of interest;
    digitally magnifying the extracted at least some data corresponding to the located area of interest to yield a magnified area-of-interest image; and
    combining the digitally magnified extracted data with at least some of the digital data of the captured image to yield data representing a modified image comprising the magnified area-of-interest image and at least a portion of the captured image; and compressing the data representing the modified image wherein the combining step results in the magnified area-of-interest image being located in an area of low interest of an image represented by the combined data.

2. The image-creation method of claim 1, further comprising buffering the digital data.

3. The image-creation method of claim 2, further comprising retrieving the captured data from the buffer.

4. The image-creation method of claim 1, wherein the locating step is performed before the capturing step.

5. The image-creation method of claim 1, further comprising identifying data corresponding to the located area of interest.

6. The image-creation method of claim 1, wherein the extracting step comprises extracting the data corresponding to the located area of interest.

7. The image-creation method of claim 1, wherein the extracting step comprises copying the at least some data corresponding to the located area of interest and not modifying the data corresponding to the located area of interest as present in the captured image.

8. The image-creation method of claim 1, further comprising identifying an area of low interest of the image.

9. The image-creation method of claim 8, wherein the combining step results in the magnified area-of-interest image being located in the area of low interest.

10. The image-creation method of claim 1, further comprising using the combined data to display the modified image.

11. The image-creation method of claim 1, further comprising: repeating the recited steps a plurality of times; and saving modified video data formed therefrom.

12. The image-creation method of claim 1, wherein, in the modified image, a portion of the captured image is replaced by the magnified area-of-interest image.

13. An article of manufacture for image creation, the article of manufacture comprising:
    at least one computer readable medium;
    processor instructions contained on the at least one computer readable medium, the processor instructions configured to be readable from the at least one computer readable medium by at least one processor and thereby cause the at least one processor to operate as to perform the following steps:
    capturing an image as digital data;
    locating an area of interest of the captured image;
    extracting, from the digital data, at least some data corresponding to the located area of interest;
    digitally magnifying the extracted at least some data corresponding to the located area of interest to yield a magnified area-of-interest image;
    combining the digitally magnified extracted data with at least some of the digital data of the captured image to yield data representing a modified image comprising the magnified area-of-interest image and at least a portion of the captured image; and compressing the data representing the modified image wherein the combining step results in the magnified area-of-interest image being located in an area of low interest of an image represented by the combined data.

14. The article of manufacture of claim 13, wherein the processor instructions are configured to cause the at least one processor to operate as to perform the following step: buffering the digital data.

15. The article of manufacture of claim 14, wherein the processor instructions are configured to cause the at least one processor to operate as to perform the following step: retrieving the captured data from the buffer.

16. The article of manufacture of claim 13, wherein the locating step is performed before the capturing step.

17. The article of manufacture of claim 13, wherein the processor instructions are configured to cause the at least one processor to operate as to perform the following step: identifying data corresponding to the located area of interest.

18. The article of manufacture of claim 13, wherein the extracting step comprises extracting the data corresponding to the located area of interest.

19. The article of manufacture of claim 13, wherein the extracting step comprises copying the at least some data corresponding to the located area of interest and not modifying the data corresponding to the located area of interest as present in the captured image.

20. The article of manufacture of claim 13, further comprising identifying an area of low interest of the image.

21. The article of manufacture of claim 20, wherein the combining step results in the magnified area-of-interest image being located in the area of low interest.

22. The article of manufacture of claim 13, wherein the processor instructions are configured to cause the at least one processor to operate as to perform the following step: using the combined data to display the modified image.

23. The article of manufacture of claim 13, wherein the processor instructions are configured to cause the at least one processor to operate as to perform the following steps: repeating the recited steps a plurality of times; and saving modified video data formed therefrom.

24. The article of manufacture of claim 13, wherein, in the modified image, a portion of the captured image is replaced by the magnified area-of-interest image.

\* \* \* \* \*